United States Patent [19]

Stephens, Jr. et al.

[11] Patent Number: 5,118,479
[45] Date of Patent: Jun. 2, 1992

[54] PROCESS FOR USING FLUIDIZED BED REACTOR

[75] Inventors: Frank M. Stephens, Jr., Lakewood; John P. Hager, Golden; Frank A. Stephens, Arvada, all of Colo.

[73] Assignee: Iron Carbide Holdings, Limited, Lakewood, Colo.

[21] Appl. No.: 561,076

[22] Filed: Aug. 1, 1990

[51] Int. Cl.⁵ ............................................. C01G 49/00
[52] U.S. Cl. .................................. 423/148; 423/439; 423/DIG. 16
[58] Field of Search ............... 75/444; 423/148, 439, 423/DIG. 16; 266/172; 422/143

[56] References Cited

U.S. PATENT DOCUMENTS

| Re. 32,247 | 9/1986 | Stephens, Jr. . |
| 2,780,537 | 2/1957 | Stelling et al. ............ 423/439 |
| 2,864,688 | 12/1958 | Reed . |
| 2,894,831 | 7/1959 | Old et al. . |
| 2,900,246 | 8/1959 | Keith et al. ............ 266/172 |
| 2,921,848 | 1/1960 | Agarwal . |
| 3,021,208 | 2/1962 | Feinman . |
| 3,356,488 | 12/1967 | Walsh . |
| 3,761,244 | 9/1973 | Hoffert . |
| 3,928,021 | 12/1975 | Matsubara et al. . |
| 4,045,214 | 8/1977 | Wetzel et al. . |
| 4,202,534 | 5/1980 | Davis, Jr. . |
| 4,360,378 | 11/1982 | Lindstrom . |
| 4,851,040 | 7/1989 | Hoster et al. . |

OTHER PUBLICATIONS

"Additional Considerations in Fluidization and Fluid-Particle Systems Pertinent to Equipment Design", by F. A. Zenz, pp. 392-395, Pemm Corp. Publications, 1957.

Primary Examiner—Melvyn J. Andrews
Attorney, Agent, or Firm—Sheridan, Ross & McIntosh

[57] ABSTRACT

A novel design for a fluidized bed reactor is provided. The fluidized bed reactor includes a baffle system to ensure the proper residence time of the feed materials. The fluidized bed reactor also provides a novel method for reducing the negative effects of thermal expansion in the reactor.

10 Claims, 2 Drawing Sheets

PROCESS FOR USING FLUIDIZED BED REACTOR

FIELD OF THE INVENTION

The present invention relates to a novel design for a fluidized bed reactor and a novel process for using the fluidized bed reactor. More particularly, the present invention relates to a fluidized bed reactor useful for converting reactor feed into iron carbide, which is particularly useful in an iron carbide steel-making process.

BACKGROUND OF THE INVENTION

Typically, iron ore is converted to steel through basic processes that have been known for many years. These processes usually involve the conversion of iron ore to pig iron in a blast furnace using coke produced in a coke oven, and the subsequent conversion of the pig iron, or hot metal, to steel in an open hearth or basic oxygen furnace. However, the high energy and capital costs involved with making steel in the traditional manner have created a demand for new, less expensive methods for producing steel. More specifically, a great deal of effort has been directed to the elimination of the blast furnace and the coke oven in steel-making. Blast furnaces use large quantities of energy, the cost and availability of which is becoming more and more uncertain. Additionally, coke ovens are a large source of pollutants, and modifications to existing coke ovens to meet government regulations are becoming prohibitively expensive.

Accordingly, some effort has been directed to the conversion of iron ore directly to iron carbide followed by the production of steel from the iron carbide, thereby eliminating the blast furnace step.

In this regard, U.S. Pat. No. Re. 32,247 by Stephens, Jr. discloses a process for the direct production of steel. Iron oxides in iron ore are converted to iron carbide, and steel is then produced directly from the iron carbide in a basic oxygen furnace or electric furnace. The electric furnace is typically an electric arc furnace, although it is possible to use other electric furnaces, such as an induction furnace. In the direct production process, the iron oxides in the iron ore are reduced and carburized in a single operation using a mixture of hydrogen (as a reducing agent) and carbon bearing substances (as carburizing agents). The process is typically carried out in a fluidized bed reactor. Steel is then produced by introducing the iron carbide into a basic oxygen furnace or electric furnace, with the blast furnace step being eliminated.

While the process of Stephens, Jr. has proven to be an important advance in the art, a need exists for further improvements in this method of directly producing steel. For example, in the step of converting the iron oxides into iron carbide, even minor variations in the process parameters can cause inferior results, e.g. minor variations in the interrelated process parameters of temperature, pressure and gas composition can cause free iron (Fe) or a variety of iron oxides such as $Fe_2O_3$, $Fe_3O_4$, and FeO to be produced rather than iron carbide.

A problem associated with the process is the use of a standard fluidized bed reactor. In such a reactor, rapid mixing of fresh feed with the material in the bed takes place. This mixing results in unreacted ore being transported to the discharge point, thus producing a product containing reacted and unreacted constituents. Another problem with standard reactor bed assemblies is that there may be an uneven pressure drop from the windbox to the reactor bed, leading to an uneven distribution of gases. Orifice plates used to regulate the drop in pressure are often limited in use, since there may be no means to control the total pressure drop. Further, orifice plates tend to expand when heated, and result in cracking of the plate or the surrounding walls. Large orifice plates also tend to sag when subjected to high heat.

The present invention provides a novel reactor design that overcomes the various problems in the prior art and enables the production of a high quality end-product.

SUMMARY OF THE INVENTION

In accordance with the present invention, a fluidized bed reactor having a plurality of baffles to define a path for the flow of reactor feed during the fluidized bed conversion process is provided.

In accordance with the present invention, an orifice plate assembly is provided having an orifice plate designed to compensate for the effects of thermal expansion. The orifice plate assembly can further comprise a plurality of gas nozzles.

In accordance with the present invention, a process is provided for the conversion of reactor feed to iron carbide using a novel fluidized bed reactor having a plurality of baffles.

In accordance with the present invention, a novel gas nozzle is provided which regulates the flow and distribution of reducing and carburizing gases into a fluidized bed reactor.

The reactor bed assembly according to the present invention provides a number of advantages. The baffled reactor design permits the reactor feed to progress through the bed in a uniform, plug flow fashion, thereby reducing the mixing of a reacted and unreacted feed. The orifice plate according to the present invention, provides a means for controlling the pressure drop between the windbox and the reactor bed and the distribution of gases. The negative effects of thermal expansion associated with orifice plates in fluidized reactors are overcome by advantageously providing a novel design, wherein the orifice plate is free to expand in substantially all directions. The novel design also allows the placement of unattached supports at the bottom of the orifice plate to minimize sagging.

DETAILED DESCRIPTION OF THE PREFERRED EMBODIMENTS

Figure 1:
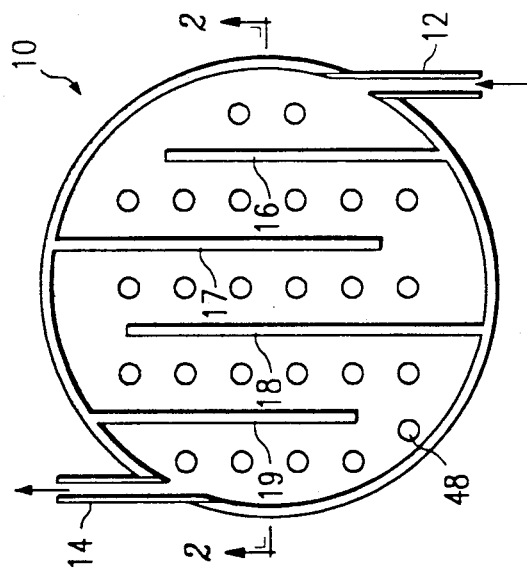
FIG. 1 is a top view of an embodiment of a fluidized bed reactor.

A process for the conversion of iron oxide ore to iron carbide and the subsequent use of that iron carbide in a direct steel-making process is disclosed in U.S. Pat. No. Re. 32,247, which is incorporated herein by reference in its entirety. This process involves the conversion of iron oxide ore fines or concentrates to iron carbide using fluidized bed units operating at relatively low temperatures and employing mixed hydrogen, carbon monoxide and hydrocarbon gases as reducing and carburizing agents.

The iron carbide is non-pyrophoric, can be transported easily, and contains a high percentage of iron. The required reducing gases can be produced utilizing conventional gas producing systems from natural gas, liquid or solid fuels, none of the systems being dependent on high-quality fuels.

In the steel-making process, the iron carbide product can be used directly in a conventional or modified basic oxygen vessel where it can be batch charged or blown into the vessel utilizing, for example, a pneumatic transfer system. While iron carbide releases heat upon oxidation, it is advantageous to use hot iron carbide directly from the fluidized bed reactor as the feed to the steel-making furnace, thereby further reducing the amount of heat energy necessary to produce steel.

To efficiently convert reactor feed to iron carbide according to the present invention, it is preferable that the feed material remain in contact with the conversion gases for a length of time sufficient to allow the diffusion controlled reactions to proceed to completion. In prior art single compartment, non-baffled fluidized bed reactors, rapid mixing of fresh feed material with the material in the bed takes place, resulting in unreacted material being transported to the discharge point and thus producing a product containing undesirable unreacted constituents.

The amount of undesired mixing is generally a function of the turbulence in the fluidized bed which, in turn, is a function of the gas velocities used for fluidization.

Since the time required to react the feed material is fixed by the reaction conditions, and the cost of decreasing the feed rate, and thus increasing the residence time is expensive, it is desirable to minimize the mixing of feed and product which occurs in the reactor.

To minimize the mixing or short circuiting, while maintaining the excellent gas-solid contact characteristics in the fluidized bed, it is preferable to create a plug flow condition for the solids in the fluidized bed reactor. A vessel of substantially uniform cross-section, for instance, any rectangular or circular cross-section, can be used as the fluidized bed reactor. However, due to thermal stresses and non-uniform heating problems in these linear reactors, it is more preferable to use a circular fluidized bed reactor having baffles that cause the feed material to move in a predetermined manner from the initial feed point to the reactor discharge point. Creating plug flow conditions in the fluidized bed reactor by using vertical baffles within the reactor causes the feed to move in a more tortuous, but uniform path through the reactor and creates a plug flow condition.

The number and arrangement of the baffles required for any given size reactor and set of conditions can be determined and the baffles adjusted accordingly. In this instance, it is desirable to know the quantity, temperature, composition, and pressure of the conversion gases, as well as the quantity, temperature and composition of the reactor feed, in order to determine the optimal baffle configuration. The optimal baffle configuration refers to the number of baffles required to give plug flow conditions, while insuring the substantial completion of the desired reaction.

The progress of the conversion can be thought of as occurring in a number of stages. In the first stage, the conversion of hematite to magnetite is substantially completed. In the remaining stages, the conversion of the magnetite to the iron carbide takes place. It is possible to analyze the set of reaction parameters, as discussed hereinabove, and calculate the degree of conversion in the stages. In this manner, it is possible to determine in advance whether the path length obtained through the baffles is sufficient to provide the desired conversion.

Figure 2:
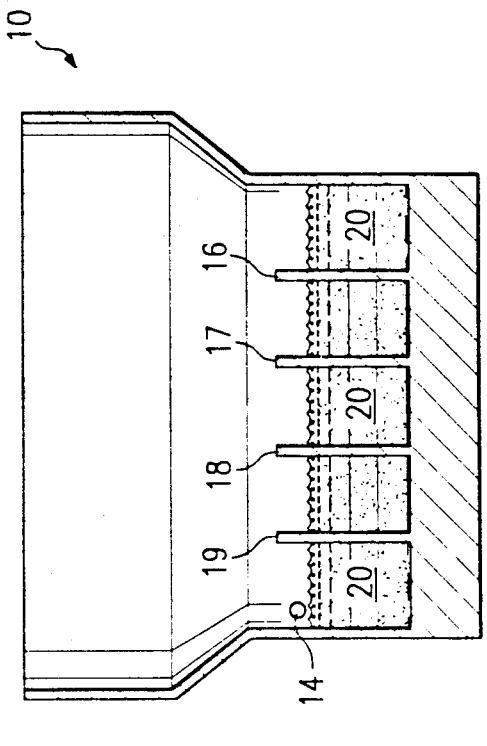
FIG. 2 is a view of an embodiment of a fluidized bed reactor in cross-section taken along line 2—2 of FIG. 1.

Referring now to FIGS. 1 and 2, an embodiment of a fluidized bed reactor according to the present invention is shown. The iron ore feed enters the fluidized bed reactor 10 at inlet 12 and proceeds through the fluidized bed reactor 10 in an essentially plug flow manner. The plug flow is created by baffles 16, 17, 18, and 19. The reactor feed is fluidized by a plurality of nozzles 48. Preferably, the nozzles are adjustable. After traversing baffle 19, the carburized reactor feed exits the reactor at outlet 14.

Preferably, the depth of the fluidized reactor bed should not be greater than twice the bed diameter. However, this ratio can change with the pressure of the incoming gases. For instance, as the pressure of the incoming gases increases, it is possible to increase the fluidized bed depth. According to the present invention, it is preferable that the reactor feed has an average diameter of between about 0.1 millimeter and about 1.0 millimeter. Corresponding to this feed size, the preferred fluidized bed depth is about 12 feet (3.66 meters), while the preferred diameter can be up to about 40 feet (12.2 meters), but is preferably not smaller than about 6 feet (1.83 meters). The gas flow is preferably sufficient to maintain a space velocity of between about 1 and about 4 feet per second (0.3 to 1.22 meters per second), more preferably about 2 feet per second (0.61 meters per second). The distance between the baffles is preferably between about 5 and about 10 feet, more preferably between about 6 and about 8 feet.

An added advantage of the baffled configuration is that in enlarged, non-baffled reactors, such as those over 10 feet in diameter, the use of a single feed and a single discharge point results in an elliptical flow pattern for solids. The elliptical flow pattern results in inactive areas at the sides of the normal flow pattern, where the incoming gas is not used for feed conversion. Thus, these inactive areas adversely affect the capacity of the reactor. With the use of baffles, the resulting flow control utilizes the full area of the reactor while requiring only a single feed and a single discharge point. This is important in the iron carbide process, where the ability of incoming gases to contact unreacted feed particles determines the efficiency with which the circulating gas can be utilized.

In a fluidized bed reactor according to the present invention, the conversion gases are preferably heated separately from the fluidized bed reactor. The conversion gases are then transferred to a wind box located below the fluidized bed and separated therefrom by an orifice plate. The orifice plate effectively controls the pressure drop and assures that the gases are distributed uniformly throughout the fluidized bed.

In order to compensate for thermal expansion which may take place in the orifice plate, so that the plate will remain flat and supported from the side, a novel "S" ring expansion system is used where the orifice plate is connected to the reactor shell. The "S" ring configuration is designed so that the bottom surface of the orifice plate does not contact the sidewalls of the reactor shell.

Thus, as the plate increases in temperature, it is free to expand in substantially all directions and no unnecessary stresses are placed on the plate or reactor shell.

Figure 3:
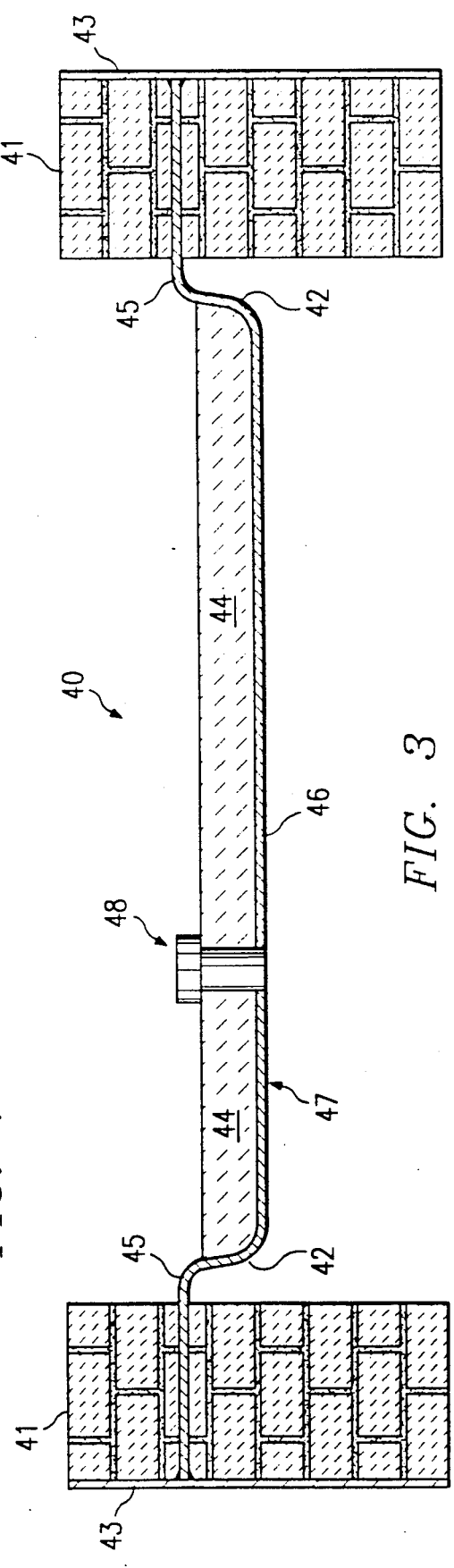
FIG. 3 is a cross-sectional view of an embodiment of an orifice plate design.

Referring now to FIG. 3, a cross-section of an orifice plate assembly according to the present invention is shown. The orifice plate assembly 40 includes an orifice plate 47. The assembly 40 is commonly circular, and in one embodiment has a diameter of about 40 feet (12.2 meters). The orifice plate 47 extends the full diameter of the assembly 40. At the inner circumference of the refractory wall 41 the orifice plate 47 intersects the refractory wall 41 and continues through the thickness of the refractory wall 41 terminating near the reactor wall 43.

Following the cross-section of the orifice plate 47 from the reactor wall 43 through the refractory wall 41 inward, the orifice plate 47 bends downward 45 near the inside of the reactor wall 41. After the downward bend 45, the orifice plate 47 then bends back upward 42 to return to a substantially horizontal plane 46. The design is consistent around the entire circumference to insure that thermal expansion can be accommodated. Thus, as the horizontal section 46 of the orifice plate that is subjected to the heat and expands, the horizontal section 46 and the upward turn 42 in the "S" design are supported, but are substantially free to expand outwardly. The stresses are absorbed primarily in the downward turning portion 45.

A refractory material 44 may be placed on the horizontal surface 46 of the orifice plate. Such material can include any heat resistant material and it has been found to be particularly useful to utilize a castable refractory for this purpose.

Another advantage of the orifice plate according to the present invention is that it is possible to place unattached supports (not shown) beneath the orifice plate to minimizing sagging. Thus, it is possible to use large diameter orifice plates, and therefore, large diameter fluidized bed reactors, without the problems associated with sagging of the orifice plate.

Figure 4:
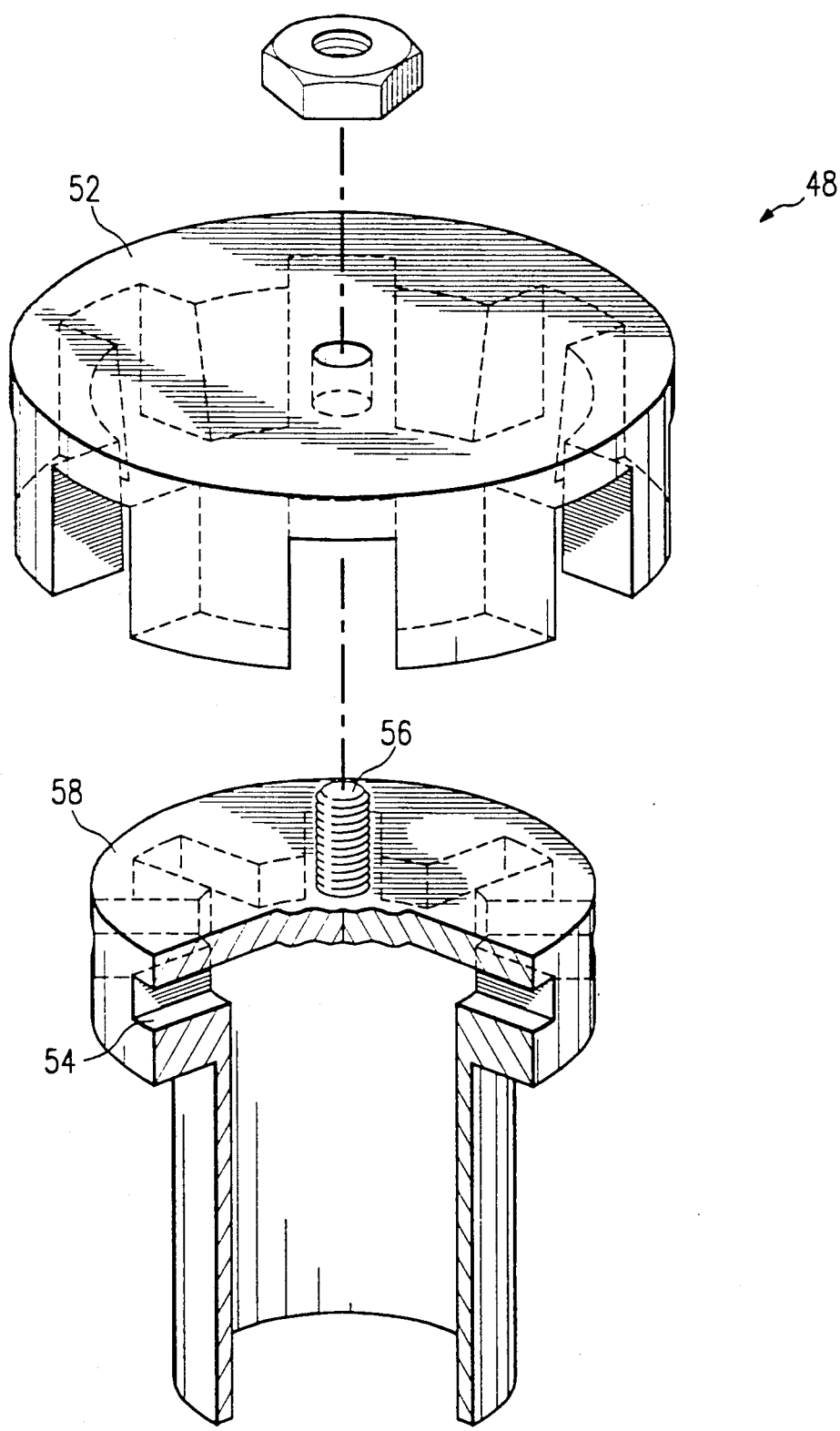
FIG. 4 is an exploded view of an embodiment of an adjustable gas nozzle.

To accurately control the pressure drop and therefore the distribution of gases moving from the windbox below the orifice plate to the fluidized bed, variable flow orifice nozzles 48 (only one shown), preferably of metallic construction, are utilized. An exploded view of an orifice nozzle according to the present invention is shown in FIG. 4. The unit includes a cap 52 that is adapted to fit securely over a base 58. The cap 52 can be rotated about a bolt 56 to selectively change the area of a plurality of openings 54 in the base perimeter. After the proper opening to allow the proper gas flow has been determined and set, the cap 52 can be locked in place by means of a set screw (not shown) which, if desired, can be welded in place. This design allows a given reactor to be used to process various sizes of feed materials using different total gas flows, while maintaining constant predetermined pressure drops across the orifice plate.

Having fully described the novel fluidized bed reactor according to the present invention, a novel process utilizing the reactor will be described. This novel process is the subject of commonly-assigned U.S. patent application No. 07,561,100 entitled "PROCESS FOR PREHEATING IRON-CONTAINING REACTOR FEED PRIOR TO BEING TREATED IN A FLUIDIZED BED REACTOR", filed on even date herewith, and incorporated herein by reference in its entirety.

The conversion of reactor feed to iron carbide is improved by preheating the reactor feed prior to conversion to iron carbide in the fluidized bed reactor. Preferably, the preheating is carried out in a kiln with an oxidizing atmosphere.

The reactor feed available for conversion to iron carbide ($Fe_3C$) is typically a mixture of magnetite ($Fe_3O_4$), hematite ($Fe_2O_3$) and other materials, rather than consisting entirely of one material. The reactor feed may also include some gangue and water. As used herein, the term reactor feed refers to any material useful in the practice of the present invention, for example, iron ore and iron ore concentrates.

The reactor feed is preferably preheated to a temperature of between about 300° C. and about 1000° C., more preferably between about 500° C. and about 900° C., and most preferably between about 600° C. and about 800° C. The reactor feed is preferably preheated for a period of time sufficient to oxidize at least a portion of the feed and improve the subsequent conversion to iron carbide. For example, at least a portion of any magnetite present in the reactor feed is converted to hematite. It is preferable to preheat the reactor feed at least until the percentage of hematite is greater than 30 percent, more preferably greater than 50 percent, and most preferably greater than 80 percent. The advantages of preheating the reactor feed in this manner will become clear with the explanation hereinbelow.

The kiln utilized for the preheating process can be any kiln which is capable of attaining the preferred temperatures and providing oxygen-containing gas to the reactor feed. As used herein, the term kiln refers to any furnace or heating unit such as a rotary hearth furnace or a fluidized bed furnace.

Gas compositions useful in the kiln atmosphere during the preheating step include any gas compositions which are capable of oxidizing the reactor feed. For example, air, which typically includes about 21 percent oxygen, can be circulated through the preheating kiln to supply oxygen. In one embodiment, excess air is added to a fuel to generate oxygen-rich combustion gases used to preheat and oxidize the reactor feed. Any gas or mixture of gases that contains free oxygen, e.g. pure oxygen and oxygen-enriched air, can be used. It is preferable that the oxygen-containing gas includes at least between about 1 percent and about 10 percent oxygen, more preferably between about 2 percent and about 5 percent oxygen.

One advantage to preheating the reactor feed in an oxidizing atmosphere is that any magnetite that may be present in the feed is partially or fully oxidized to hematite, prior to being converted to iron carbide. It has been found that hematite is more readily converted to iron carbide than is magnetite. While not wishing to be bound by theory, it is believed that the improvement is attributable to the opening of interstitial pores in the iron oxide structure when additional oxygen atoms are forced into the structure during the preheat step and then removed from the structure during the reduction, leaving a more porous structure available for subsequent diffusion controlled reactions.

In addition to the oxidation of magnetite to hematite, other advantages are realized by utilizing the process of the present invention. For example, sulfur is eliminated or stabilized when preheated in an oxidizing atmosphere. In an oxidizing preheat step, sulfide sulfur content is significantly reduced by conversion to sulfur dioxide ($SO_2$), which is a volatile gas, or stabilized by being oxidized and subsequently combined with alkaline earth oxides, such as calcium oxide or potassium oxide, to form thermally stable sulfates. It has been found that the presence of sulfide sulfur in the reactor feed during the conversion step retards the production of iron carbide. Thus, preheating in an oxidizing atmosphere yields another unexpected result that is beneficial to the production of iron carbide from the reactor feed.

The preheat step also reduces free moisture as well as moisture of hydration, thus reducing the amount of water entering the conversion reactor. In this respect, the minimization of moisture is important since the conversion step is partially controlled by the amount of hydrogen which can be converted to water by combining with oxygen in the feed. Due to chemical equilibrium constraints, any increase in water coming into the reactor limits the amount of water that can be formed in the reactor. Hence, removal of the water in the preheat step improves the efficiency and capacity of the process. Preferably, the total water content in the preheated reactor feed is less than about 4 percent, more preferably, less than about 3 percent, and most preferably less than about 2 percent.

Finally, by preheating the reactor feed, less heat needs to be added to the fluidized bed reactor system by the conversion gases or by heating the fluidized bed reactor.

After the reactor feed has been preheated, the feed is then converted to iron carbide, preferably in a fluidized bed reactor, as described hereinabove.

To insure that the end product is substantially iron carbide, the composition of the conversion gases, the pressure and the temperature must be tightly controlled. Preferably, this control is maintained by a computer automated system, which is the subject of commonly assigned and copending U.S. patent application Nos. 561,100 and 561,077, entitled "METHOD FOR CONTROLLING THE CONVERSION OF IRON-CONTAINING REACTOR FEED INTO IRON CARBIDE", and "PROCESS FOR CONTROLLING THE PRODUCT QUALITY IN THE CONVERSION OF REACTOR FEED INTO IRON CARBIDE", respectively, both of which are incorporated by reference herein, in their entirety.

Typically, the equilibrium gas system comprises five gases. These include water ($H_2O$), carbon monoxide (CO), carbon dioxide ($CO_2$), hydrogen ($H_2$), and methane ($CH_4$). Additionally, there may be some nitrogen ($N_2$) present in the system.

While the above constitutes the equilibrium gases, it is to be understood that hydrogen, carbon and oxygen can be added to the system in any number of forms, including gaseous or solid form, so that the five gases at any given temperature and pressure are in the preferred proportions. For example, other hydrocarbon gases, such as propane ($C_3H_8$), can be added to attain the proper equilibrium of hydrogen, carbon and oxygen.

Preferably, the incoming gas from the windbox contains the following (or the equivalents thereof), in mole percent: up to about 20 percent, preferably between 5 and about 10 percent carbon monoxide; up to about 20 percent, preferably between about 2 and about 8 percent, carbon dioxide; up to about 80 percent, preferably between about 35 and about 50 percent methane; up to about 80 percent, preferably between about 35 and about 50 percent hydrogen; from about 0 percent to about 15 percent, preferably between about 0 and about 10 percent nitrogen; and up to about 5 percent, preferably between about 1 and about 2 percent water vapor.

During the conversion, the gas pressure above the fluidized bed reactor is preferably in the range of about 15 psia to about 45 psia (about 100 to about 310 kPa), more preferably between about 15 psia and about 30 psia (about 100 to about 210 kPa). The temperature in the windbox space below the fluidized bed is preferably in the range between about 500° C. and 750° C., and more preferably in the range between about 600° C. and about 700° C. The temperature in the space above the fluidized bed is preferably in the range between about 500° C. and about 650° C., and more preferably between about 550° C. and about 600° C.

After conversion, the iron components in the carburized feed preferably comprise at least about 90 percent, more preferably, at least about 95 percent, more preferably at least about 97 percent, and most preferably at least 98 percent iron carbide. The remaining impurities typically include oxides or metallic iron. Preferably, the maximum iron oxide content is about 2 percent, while the maximum amount of metallic iron is about 1 percent.

The iron carbide produced according to the present process may have a layer of hydrogen on its surface upon exiting the fluidized bed reactor. Since catalytic combustion of the hydrogen can cause the material to become pyrophoric, it is desirable to rinse the iron carbide to remove this hydrogen layer. For instance, the iron carbide may be subjected to a flow of inert gas such as nitrogen, carbon dioxide, or a noble gas, to remove the hydrogen. The flow rate and quantity of gas should be sufficient to remove most of the hydrogen. Alternatively, the hydrogen may be removed by placing the iron carbide in a vacuum.

According to one embodiment of the present process, the iron carbide can be utilized in a direct steel-making process. Preferably, the conversion of the iron carbide to steel occurs in a basic oxygen furnace. Because of the nature of the basic oxygen furnace process, special conditions apply to the processing of iron carbide to steel by this process as compared to other steel-making processes and furnaces.

If the reducing step and the steel-making step are close-coupled, heat calculations show that only a small amount of added heat is required to make the process auto-thermal. Preferably, the iron carbide comes out of the fluidized bed unit at an elevated temperature of about 490° C. to about 710° C., more preferably from about 550° C. to about 600° C., and is added directly to the basic oxygen furnace at that temperature. Alternatively, the iron carbide can be further heated to 1200° C. to provide all of the heat to make the process auto-thermal.

The off-gases from the steel-making furnace may be channelled directly to the fluidized bed unit. In this embodiment of the process, substantially all of the carbon required in the fluidized bed unit to convert the reactor feed to iron carbide is recovered as carbon monoxide in the furnace and recycled through the fluidized bed unit to be reused in producing iron carbide.

If the iron carbide product is cooled before the steel-making step, then heat must be added either in the form of reheating the product or adding extra heat to the steel-making step.

Heat balance calculations show that at ambient temperature, iron carbide does not contain fuel value sufficient to permit the reaction taking place in the basic oxygen furnace to be auto-thermal. The additional heat required to make the reaction self-sustaining can be supplied in a number of ways. For example, the off-gas from the basic oxygen furnace produced by the processing of iron carbide contains about 90 percent carbon monoxide in addition to substantial sensible heat. The sensible heat may be exploited through the use of heat exchangers or otherwise to heat the incoming iron carbide. By burning a portion of the off-gas, sufficient heat can be generated to augment the sensible heat and to affect the required preheating of the incoming iron carbide charge to make the process auto-thermal. Under some conditions, the sensible heat alone is sufficient or the heat for the preheating can be obtained entirely from combustion of the off-gas. Preferably, the preheat temperature range is from about 700° C. to about 1200° C., more preferably from about 1100° C. to about 1200° C.

As another alternative, the heat required to make the process auto-thermal can be supplied wholly or in part by direct heating of the Fe₃C charge with an external heat source. Sufficient carbon may also be added to the iron carbide to provide any required additional heat by combustion during the process. The amount of carbon added varies from about 3 weight percent to about 5 weight percent of the iron carbide. The carbon may be added directly to the iron carbide by preheating the iron carbide in carbon-bearing gases consisting primarily of carbon monoxide. Alternatively, hot metal may be added to the oxygen furnace charge to provide additional heat.

In conventional basic oxygen steel-making, scrap iron is typically added to molten pig iron (hot metal) for cooling purposes. In accordance with the present process, instead of scrap iron, cold iron carbide charge can be added to molten pig iron in the basic oxygen or electric furnace. A significant advantage of this feature is that iron carbide can be added as a coolant in an amount two times the amount of scrap iron that can be added to conventional basic oxygen furnace processes for cooling. For example, iron carbide can be added in an amount up to 50 percent by weight of the iron carbide hot metal charge. On the other hand, the standard basic oxygen furnace procedure calls for adding about 70 percent hot metal and about 30 percent scrap iron. Using iron carbide, less hot metal is added to the charge, therefore, a plant that uses scrap iron as a coolant can make 50 percent more steel by using iron carbide. One advantage of this is that blast furnaces which may presently be in place can continue to be operated in conjunction with the present process.

If the steel-making is conducted in an electric furnace, any extra heat required may be supplied by means of the electrical energy normally used in this type of furnace.

The above procedures may be used, alone or in combination, for providing the necessary heat for the iron carbide charge to make the reaction in the basic oxygen furnace auto-thermal, if desired.

A number of advantages of this process are apparent from the above description. One advantage is that it eliminates the expensive, intermediate blast furnace step in converting iron ore to steel. When the converting and steel-making steps are performed in combination at the same site, only a small amount of added heat is necessary for the steel-making step and carbon monoxide from the steel-making step provides the necessary carbon for carburization of reactor feed. When molten pig iron (hot metal) is used in steel-making, large amounts of iron carbide can be added for cooling. The overall process is practically pollution-free and provides for maximum conservation and reuse of non-product reactants. A further advantage of the overall process is that it results in a savings in transportation costs when the carbide is made near the mine before transport to the steel-making furnace since iron carbide contains a higher percentage of usable material than iron oxide.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A process for the conversion of reactor feed to iron carbide, comprising the steps of:
   a) preheating the reactor feed; and
   b) converting the preheated reactor feed to iron carbide in a fluidized bed reactor;
   wherein the fluidized bed reactor comprises a reactor bed internally partitioned by a plurality of baffles defining a substantially uniform flow path for the reactor feed, the flow path being a sufficient length to permit the conversion of at least about 90 percent of the iron in the reactor feed to iron carbide.

2. A process as claimed in claim 1, wherein said fluidized bed reactor is substantially circular.

3. A process as claimed in claim 2, wherein said fluidized bed reactor has a diameter of up to about 40 feet, and the distance between said baffles is between about 5 feet and about 10 feet.

4. A process as claimed in claim 1, wherein said baffles are substantially parallel and the distance between said baffles is between about 5 feet and about 10 feet.

5. A process as claimed in claim 1, wherein said converting step includes contacting the reactor feed with an equilibrium gas system comprising water, carbon monoxide, carbon dioxide, hydrogen and methane.

6. A process as claimed in claim 5, wherein said step of contacting said reactor feed takes place at a temperature of from about 500° C. to about 750° C.

7. A process as claimed in claim 1, wherein said converting step includes contacting said feed with a gas having a space velocity of from about 1 to about 4 feet per second.

8. A process as recited in claim 1, wherein at least about 97 percent of the iron in the reactor feed is converted to iron carbide.

9. A process as claimed in claim 1, wherein said preheating step comprises preheating said reactor feed in an oxidizing atmosphere to oxidize at least a portion of said reactor feed.

10. A process for the conversion of reactor feed to iron carbide, comprising the steps of:
   (a) preheating said reactor feed in an oxidizing atmosphere to oxidize at least a portion of said reactor feed; and
   (b) contacting the preheated reactor feed with an equilibrium gas composition comprising water, carbon monoxide, carbon dioxide, hydrogen and methane to convert the preheated reactor feed to iron carbide in a fluidized bed reactor;
   wherein the fluidized bed reactor comprises a substantially circular reactor bed internally partitioned by a plurality of baffles defining a substantially uniform flow path for the reactor feed, said baffles being spaced between about 5 and about 10 feet apart and said flow path being a sufficient length to permit the conversion of at least about 90 percent of the iron in the reactor feed to iron carbide.

* * * * *